United States Patent
Dangi et al.

(10) Patent No.: US 11,283,853 B2
(45) Date of Patent: Mar. 22, 2022

(54) GENERATING A DATA STREAM WITH CONFIGURABLE COMMONALITY

(71) Applicant: EMC IP Holding Company LLC, Hopkinton, MA (US)

(72) Inventors: Salil Dangi, Mission Viejo, CA (US); Ernest Daza, Aliso Viejo, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/389,700

(22) Filed: Apr. 19, 2019

(65) Prior Publication Data

US 2020/0336531 A1    Oct. 22, 2020

(51) Int. Cl.
  *G06F 15/16*    (2006.01)
  *H04L 65/60*    (2022.01)
  *H04L 43/50*    (2022.01)

(52) U.S. Cl.
  CPC ............ *H04L 65/607* (2013.01); *H04L 43/50* (2013.01)

(58) Field of Classification Search
  CPC .............................. H04L 65/607; H04L 43/50
  USPC .................................................. 709/231–232
  See application file for complete search history.

(56) References Cited

U.S. PATENT DOCUMENTS

| | | | |
|---|---|---|---|
| 6,624,761 B2 * | 9/2003 | Fallon | G06T 9/00 341/51 |
| 6,816,093 B1 | 11/2004 | Jaquette | |
| 6,999,445 B1 * | 2/2006 | Dmitriev | H04L 5/02 370/335 |
| 8,223,673 B2 * | 7/2012 | Miriyala | H04L 12/1813 370/260 |
| 9,838,496 B2 * | 12/2017 | Lection | H04L 67/18 |
| 10,038,733 B1 | 7/2018 | Dangi et al. | |
| 10,114,832 B1 | 10/2018 | Dangi et al. | |
| 10,114,850 B1 | 10/2018 | Dangi et al. | |
| 10,163,371 B1 | 12/2018 | Dangi et al. | |
| 10,235,134 B1 | 3/2019 | Dangi et al. | |
| 10,638,150 B1 * | 4/2020 | Dangi | H04L 65/608 |
| 11,128,935 B2 * | 9/2021 | Li | H04N 19/12 |
| 2006/0150229 A1 * | 7/2006 | Blair | H04M 1/6505 725/115 |
| 2012/0114310 A1 * | 5/2012 | Hymel | H04N 9/8205 386/285 |
| 2014/0118541 A1 | 5/2014 | Lasko | |
| 2014/0136897 A1 * | 5/2014 | Selivanov | G01R 31/31813 714/33 |

(Continued)

FOREIGN PATENT DOCUMENTS

WO    2016137203    9/2016

OTHER PUBLICATIONS

International Search Report and Written Opinion for PCT/US2019/053878 dated Jan. 31, 2020.

(Continued)

*Primary Examiner* — Bharat Barot
(74) *Attorney, Agent, or Firm* — Workman Nydegger (57) ABSTRACT

One example method includes receiving 'n' data streams, where 'n' is ≥2, receiving a commonality parameter 'F', creating a mixed data stream having a commonality of 'F' by mixing data from the 'n' data streams together, and outputting the mixed data stream. The mixed data stream may be provided to a deduplication engine for deduplication of stream data that is common to one or more other data streams.

18 Claims, 5 Drawing Sheets

(56) References Cited

U.S. PATENT DOCUMENTS

| 2014/0279874 | A1* | 9/2014 | Reiter ................ G06F 11/3414 |
| | | | 707/610 |
| 2015/0319268 | A1* | 11/2015 | Callard ................ H04L 65/607 |
| | | | 709/231 |
| 2016/0103757 | A1 | 4/2016 | Liu |
| 2017/0220593 | A1 | 8/2017 | Tripath et al. |
| 2019/0034450 | A1 | 1/2019 | Dangi et al. |

OTHER PUBLICATIONS

Universal Mobile Telecommunications System; Multiplexing and channel coding; Technical Specification, European Telecommunications Standards Institute Sophia Antipolis Cedex. France, vol. 3-R1, No. V7.3.0 Dec. 1, 2006, XP014036328.
"Data Compression/Evaluating Compression Effectiveness" internet article, Feb. 21, 2017, XP002796742, accessed on Jan. 9, 2020 via: https://en.wikibooks.org/w/index.php?title=Data_Compression/Evaluating_Compression_Effectiveness&oldid=3164899.
U.S. Appl. No. 16/389,671, Jan. 8, 2020, Notice of Allowance.
U.S. Appl. No. 16/389,671, filed Apr. 19, 2019, Dangi et al.
U.S. Appl. No. 16/389,729, filed Apr. 19, 2019, Dangi et al.
U.S. Appl. No. 16/389,741, filed Apr. 19, 2019, Dangi et al.
ISR and WO issued in application No. PCT/2019/066619 dated Jun. 23, 2020.
ISR and WO issued in application No. PCT/2019/066632 dated Mar. 31, 2020.
International Preliminary Reporton Patentability received for PCT Patent Application No. PCT/US2019/066632, dated Oct. 28, 2021, 7 pages.

\* cited by examiner

GENERATING A DATA STREAM WITH CONFIGURABLE COMMONALITY

RELATED APPLICATIONS

This application is related to: U.S. Pat. No. 10,038,733 (Ser. No. 14/489,317, filed Sep. 17, 2014), entitled GENERATING A LARGE, NON-COMPRESSIBLE DATA STREAM, issued Jul. 31, 2018; U.S. Pat. No. 10,114,832 (Ser. No. 14/489,363, filed Sep. 17, 2014), entitled GENERATING A DATA STREAM WITH A PREDICTABLE CHANGE RATE, issued Oct. 30, 2018; and, U.S. Pat. No. 10,114,850 (Ser. No. 14/489,295, filed Sep. 17, 2014), entitled DATA STREAM GENERATION USING PRIME NUMBERS, issued Oct. 30, 2018. This application is also related to: U.S. patent application Ser. No. 16/389,729, entitled GENERATING A DATA STREAM WITH CONFIGURABLE CHANGE RATE AND CLUSTERING CAPABILITY, filed the same day herewith; U.S. patent application Ser. No. 16/389,671, entitled GENERATING A DATA STREAM WITH CONFIGURABLE COMPRESSION, filed the same day herewith; U.S. patent application Ser. No. 16/389,741, entitled GENERATING AND MORPHING A COLLECTION OF FILES IN A FOLDER/SUB-FOLDER STRUCTURE THAT COLLECTIVELY HAS DESIRED DEDUPABILITY, COMPRESSION, CLUSTERING AND COMMONALITY, filed the same day herewith; U.S. Pat. No. 10,163,371, (Ser. No. 15/420,633, filed Jan. 31, 2017), entitled ROTATING BIT VALUES BASED ON A DATA STRUCTURE WHILE GENERATING A LARGE, NON-COMPRESSIBLE DATA STREAM, issued Dec. 25, 2018; and, U.S. Pat. No. 10,235,134 (Ser. No. 15/420,614, filed Jan. 31, 2017), entitled ROTATING BIT VALUES WHILE GENERATING A LARGE, NON-COMPRESSIBLE DATA STREAM, issued Mar. 19, 2019. All of the aforementioned patents and applications are incorporated herein in their respective entireties by this reference.

FIELD OF THE INVENTION

Embodiments of the present invention generally relate to generation of data streams having various attributes. More particularly, at least some embodiments of the invention relate to systems, hardware, software, computer-readable media, and methods for generating data streams whose compression and commonality are configurable.

BACKGROUND

Developers and other personnel often have a need to simulate characteristics of real world data streams that are generated by applications that are in a developmental stage. Simulation of real world data stream characteristics, such as commonality for example, enables the developer to identify and correct any problems, and enhance performance of the application, before the application, or a revision of the application, is rolled out.

Various algorithms have been developed for generation of data streams. However data streams generated by these algorithms may be relatively narrow in terms of their applicability and usefulness. This may be due to various factors. For example, the speed with which such streams are generated may not be adequate. As another example, data streams generated by such algorithms may be incompressible. Further, such data streams may not be deduplicatable. These, and other, factors may tend to limit the effectiveness, in some applications, of the data streams produced by some data stream generation algorithms.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to generation of data streams having various attributes. More particularly, at least some embodiments of the invention relate to systems, hardware, software, computer-readable media, and methods for generating data streams whose compression and/or commonality are configurable. The data in a given data stream may be referred to herein as a dataset.

More particularly, example embodiments of the invention employ data stream mixing to generate a data stream having particular compression properties and/or commonality properties. Depending upon the implementation, two, or more, data streams may be mixed. The resulting data stream created by the mixing of two or more data streams may be used in a variety of applications. To illustrate, such a resulting, or synthesized, data stream may be used in applications where high speed generation of a data stream, having particular compression and/or commonality properties, is needed for automated and/or manual testing of an application, hardware, and/or other elements. Example data streams may be generated at rates exceeding 1 GBPS. In at least some embodiments, compressible streams, and incompressible data streams, can be generated by the methods and systems disclosed in one or more of the Related Applications.

One of the data streams that is to be mixed with one or more other data streams may have a compressibility of about 0%, although that is not required. Examples of such data streams, and methods for generating them, are disclosed in one or more of the Related Applications noted herein. Additionally, or alternatively, one of the data streams that is to be mixed with one or more other data streams may have a compressibility of about 100%, although that is not required. More generally, data streams employed in connection with embodiments of the invention need not have any particular compressibility.

In accordance with various embodiments of the invention, two, or more, data streams may be combined together in such a way as to generate a new data stream having a particular commonality factor. For example, a first one of the constituent data streams is generated by a first computing entity that is part of a population of computing entities. The first constituent data stream may comprise, or consist of, data that is common to respective data streams generated by one or more other computing entities in the population. A second one of the constituent data streams may comprise, or consist of, data that is unique to a second computing entity. The first and second constituent data streams are mixed with each other to generate a new data stream that has a desired degree of commonality with respect to the computing entities in the population. In some alternative embodiments, the constituent data streams may also be processed such that the new data stream has, in addition to a particular commonality factor, a compressibility. Such compressibility results automatically from the respective compressibilities of the constituent data streams, as well as from the commonality of the constituent data streams, as explained in one or more of the Related Applications.

In some embodiments, multiple data streams are mixed together to generate a new data stream having a particular commonality factor. Where any two or more data streams are mixed together, the respective data of the data streams may be interleaved, such as on a data block, data sequence, or other, basis, to form the new data stream. The data streams can be mixed in a variety of ways, such as clustered, uniform, random, or normalized mixing.

Finally, and as noted earlier, these constituent streams may, in some embodiments, also each have a respective compressibility. As such, the mixed data stream may likewise possess a particular compressibility, which is based on the respective compressibilities of the constituent data streams.

Advantageously then, embodiments of the invention may provide various benefits and improvements relative to the configuration and operation of conventional hardware, software, systems and methods. For example, an embodiment of the invention enables customization of a data stream to meet testing, analytical, and diagnostic needs in a computing environment. Example embodiments of the invention enable generation of data stream having a particular commonality with respect to respective data streams generated by computing entities in a population of computing entities. The commonality feature helps to simulate data that is common across multiple groups of owners. This is useful in the context of deduplication engines and processes, which need to be both effective and efficient in their deduplication operations. Moreover, the flexibility of embodiments of the invention enable generation of data streams specifically suited for performance of customized testing, analytical, and diagnostic, processes in a computing environment. Among other things, such embodiments enable the identification of areas where improvements may be made in the operation of an application and/or computing system hardware and other software.

In some instances, still other embodiments of the invention provide for generation of a mixed data stream that not only has a desired commonality factor, but also has a particular 'non-zero' compressibility. The compressibility feature helps to simulate data that is partly compressible, which is a common data type in many applications.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data generation and data management operations. Such data management operations may include, but are not limited to, data read/write/delete operations, data deduplication operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. In some instances, embodiments of the invention generate data streams for use in testing systems and applications in various environments, one example of which is a data protection environment.

A data protection environment, for example, may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications that generate data that is desired to be protected. In general, the applications employed by the clients are not limited to any particular functionality or type of functionality. Some example applications and data include email applications such as MS Exchange, filesystems, as well as databases such as Oracle databases, and SQL Server databases. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

Figure 1:
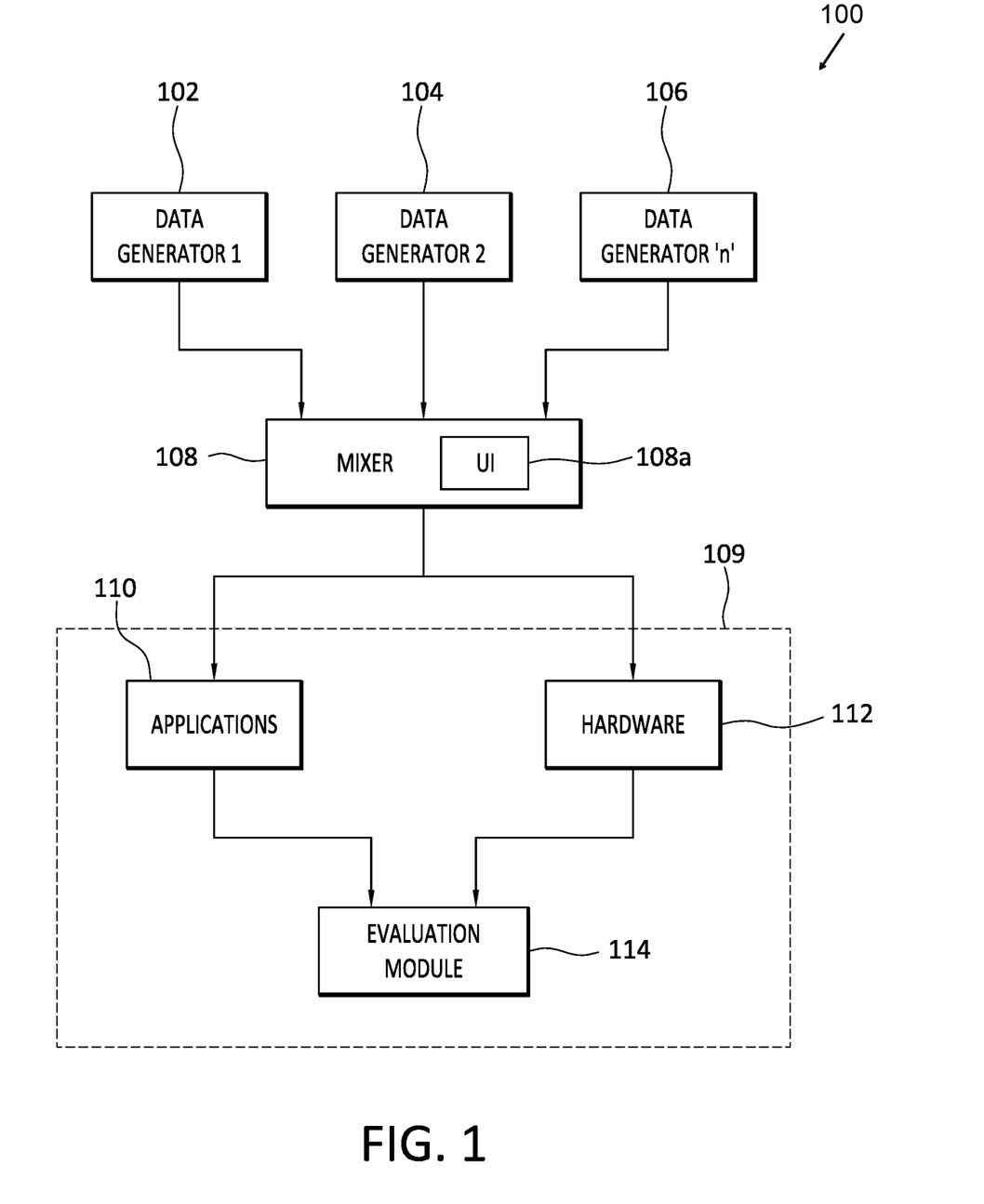
FIG. 1 discloses aspects of an example operating environment for some embodiments of the invention.

With particular attention now to FIG. 1, one example of an operating environment is denoted generally at 100. In some embodiments, the operating environment may comprise, or consist of, a data protection environment. The operating environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

In the illustrated example, the operating environment 100 may include any type and number of data generators 102, 104 and 106. In general, the data generators 102 ... 106 may be any software, hardware, or combination of software and hardware, that is operable to generate data. The software may, in some embodiments, comprise, or consist of, one or more applications, and the applications may be of any type. Thus, in some cases, one or more of the data generators 102 ... 106 may comprise a client device that hosts one or more applications. The data generated by a data generator may, or may not, be targeted for protection and backed up, such as at a cloud datacenter for example. In some embodiments, one, some, or all, of the data generators 102 ... 106 may comprise a purpose-built entity, which may comprise hardware and/or software, specifically configured to generate mixed data streams having a particular commonality factor. In some embodiments, such mixed data streams may also have a particular compressibility.

As further indicated in FIG. 1, the operating environment 100 may include a mixer 108. In general, the mixer 108 is operable to combine data streams from the data generators 102 ... 106 so as to create a new data stream. Each new data stream created by the mixer 108 can be generated in such a way as to have a particular commonality attribute and, in some embodiments, a particular compression attribute.

The operation of the mixer 108 may be configurable via various parameters, and these parameters may help to shape the properties of the output data stream. These parameters of an output data stream created by the mixer 108 may be specified, for example, by a user using a user interface (UI) 108a and/or application program interface (API) associated with the mixer 108. The UI may be any type of user interface including, but not limited to, a graphical user interface (GUI), or a command line interface (CLI). The mixer 108 can then use the user input to generate a new data stream by mixing two or more input data streams. User inputs provided by way of the UI, and/or other mechanism, may include, but are not limited to, any one or more of: the amount of data of the output stream; one or more self seeds; one or more base seeds; the identity of the source data streams; the identity of the data generators; a desired commonality factor F (a set of respective commonality values for each of the input data streams); and, a respective compressibility parameter for each source data stream. In an embodiment, the mixer 108 may combine multiple data streams from each of a plurality of respective sources, such as from the data generators 102 ... 106 for example.

The mixer 108 may be implemented as hardware, software, or a combination of hardware and software. In some embodiments, the mixer 108 takes the form of an application that may be hosted on a server, or any other type of host device. The mixer 108 may reside at a user premises, at a cloud datacenter, and/or at any other site. In some embodiments, the mixer 108 may be an element of another system or device, such as a deduplication server for example. Thus, in such embodiments, an output data stream generated by the mixer 108 may then be deduplicated by the deduplication server. However, the mixer 108 need not be an element of a deduplication server and, in other embodiments, the output data stream generated by the mixer 108 may be provided to a deduplication server for deduplication. It is further noted that the output data stream generated by the mixer 108 can be fed to any module or modules, such as a deduplication server for example, to perform simulated testing. As well, the output data stream generated by the mixer 108 can be converted to smaller buckets, such as a file structure for example, and these buckets then fed to any module or modules, such as a deduplication server for example, to perform the testing of the application that works on the bucket protection and the deduplication server.

With continued reference to FIG. 1, the mixer 108 may constitute an element of, or communicate with, a test environment 109. The test environment 109 may include, for example, one or more applications 110 and/or one or more hardware devices 112. In general, the data streams generated by the mixer 108 may be provided by the mixer 108 to an application 110 and/or hardware device 112 for testing, analysis, and/or diagnostic, operations. Such data streams may, or may not, be deduplicated before being provided to the test environment 109.

More particularly, the data streams generated by the mixer 108 may be provided to, and utilized by, an application 110 and/or hardware device 112. The outputs and/or other responses of the application 110 and/or hardware 112 can then be provided to an evaluation module 114 for analysis and diagnostics. In some embodiments, the evaluation module 114 is an element of the mixer 108. In other embodiments however, the evaluation module 114 is separate and distinct from the mixer 108.

By generating data streams using inputs from one or more data generators, the mixer 108 enables the testing of application 110 and/or hardware 112 so that analyses may be performed, and solutions identified for any problems observed. The flexibility of embodiments with respect to customizing the commonality and/or compressibility of data streams generated by the mixer 108 enables a wide variety of test and evaluation scenarios to mimic, or replicate, real world conditions. It is also noted that a performance benchmarking of a test environment, including an application/deduplication engine, can be performed with minimum amount of resources since the mixer 108, when coupled with the data generation algorithms of the Related Applications, can generate data streams at speeds well above the fastest available drives.

B. Example Host and Server Configurations

Figure 2:
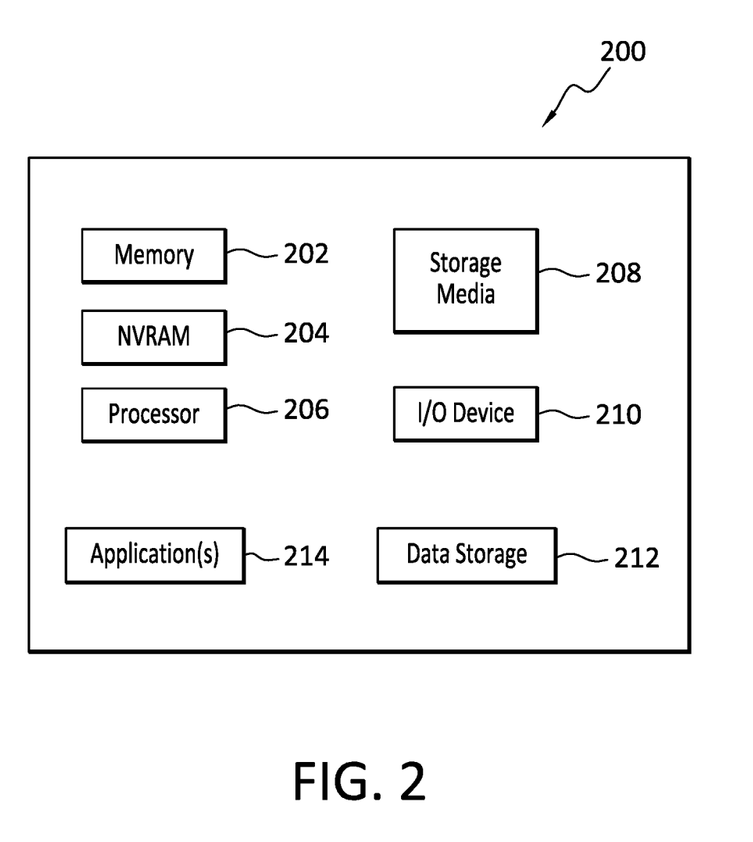
FIG. 2 discloses aspects of an example host configuration.

With reference briefly now to FIG. 2, any one or more of the data generators 102 . . . 106, mixer 108, test platform 109, applications 110, hardware 112, evaluation module 114, data generators 402 and 404, mixer 410, and a deduplication engine, can take the form of, or include, or be implemented on, or hosted by, a physical computing device, one example of which is denoted at 200. As well, where any of the aforementioned elements comprise or consist of a virtual machine (VM), that VM may constitute a virtualization of any combination of the physical components disclosed in FIG. 2.

In the example of FIG. 2, the physical computing device 200 includes a memory 202 which can include one, some, or all, of random access memory (RAM), non-volatile random access memory (NVRAM) 204, read-only memory (ROM), and persistent memory, one or more hardware processors 206, non-transitory storage media 208, UI device 210, and data storage 212. One or more of the memory components 202 of the physical computing device 200 can take the form of solid state device (SSD) storage. As well, one or more applications 214 are provided that comprise executable instructions. Such executable instructions can take various forms including, for example, instructions executable to perform any method or portion thereof disclosed herein, and/or executable by/at any of a storage site, whether on-premises at an enterprise, or a cloud storage site, client, datacenter, backup server, blockchain network, or blockchain network node, to perform functions disclosed herein. As well, such instructions may be executable to perform any of the other operations disclosed herein including, but not limited to, data stream mixing, data stream evaluation and analysis, data stream generation, read, write, backup, and restore, operations and/or any other data protection operation, auditing operations, cloud service operations.

C. Modified Data Stream With Configurable Commonality

Details are now provided concerning some arrangements configured to generate data streams having a desired commonality factor. In general, a desired commonality factor 'F' for the output data stream can be specified, such as by a user for example, and then a mixer combines two or more constituent data streams to create the output data stream having the desired commonality factor. It is noted that where 'n' input streams ('n' is an integer 2) are provided to a mixer, the commonality factor F that is provided to the mixer as a merge parameter is actually a set of values that includes a respective commonality value for each of the base seeds. Thus, for example, a commonality factor F for 'n' base seeds would include the commonality values f1, f2, f3 . . . fn. As discussed below, some particular embodiments provide for data streams that not only have a desired commonality factor, but also possess compressibility.

By way of example, suppose that each of the clients in a population of clients generates a respective stream of data, 80% of which is unique to the respective client, and the other 20% of which is common to one or more other clients in the population. In this example, unique combinations are used that each identify a respective client, of a particular population of clients. Thus, a base seed of 1 corresponds to a particular population of clients, and a self seed 101 identifies a particular client in that population. As such, that particular client can be identified by the unique combination (1, 101). Another client, in the same population, may be identified by the unique combination (1, 102), where the base seed 1 identifies the population, and the self seed 102 is unique to the additional client of that population.

The respective data streams of the two clients, that is, the clients respectively identified by the unique combinations (1, 101) and (1, 102) can then be fed, independently of each other, to a deduplication engine. Because each of the clients (1, 101) and (1, 102) generates a data stream having 20% of its data in common with the other client, that is, 20% base data, and including 80% data unique to the respective client, that is, 80% self seed data, the 20% common data can be deduplicated by the deduplication engine. As is apparent, the base data amounts and self seed data amounts may be the same for two, or more, streams. In other embodiments, the mix of base data and self seed data may vary from one data stream to another.

Figure 3:
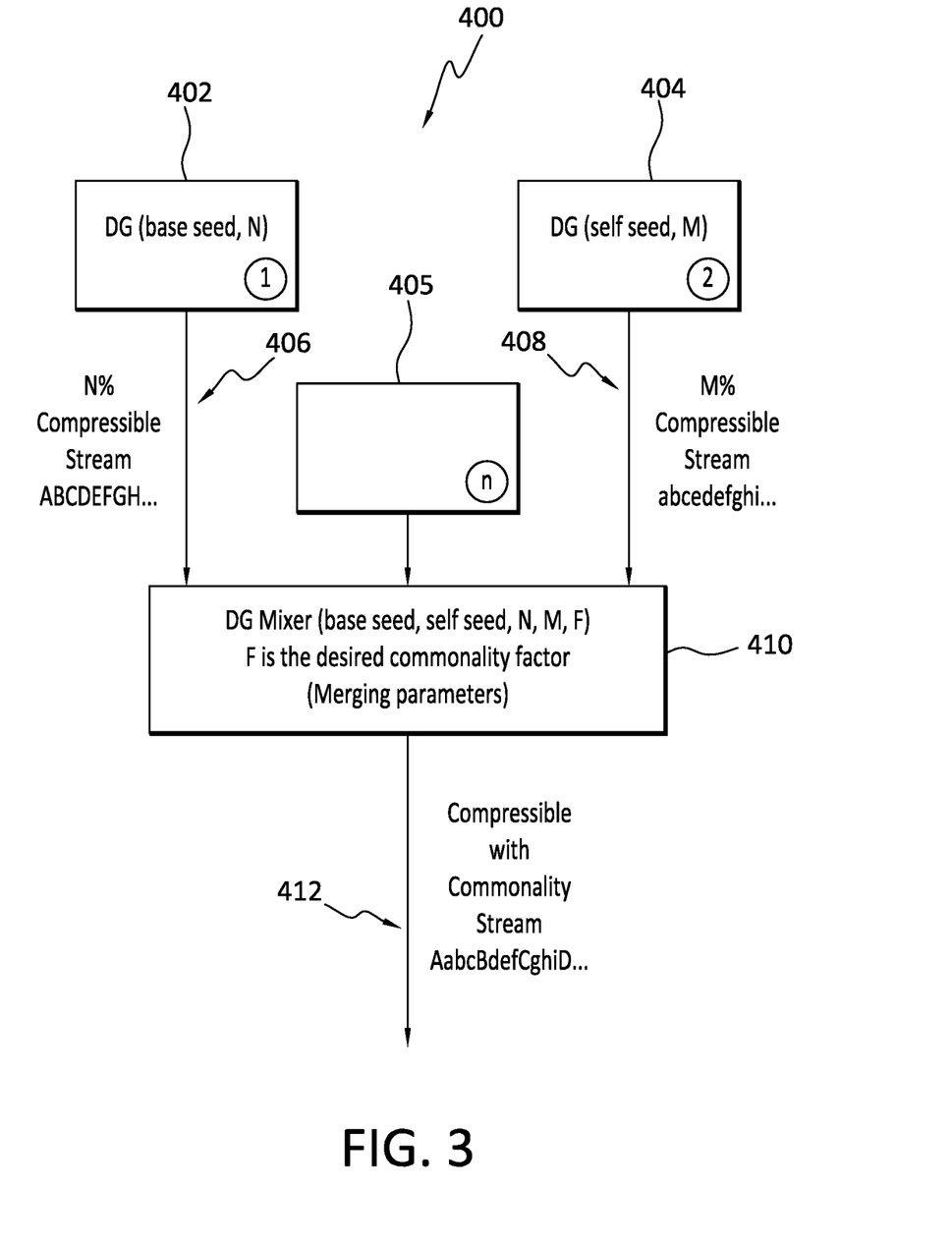
FIG. 3 discloses some general aspects of a configuration in which two or more data streams are mixed together to generate a mixed data stream of particular data commonality, and a particular compressibility.

With particular attention now to FIG. 3, details are provided concerning systems and processes for generating data streams having a user-configurable commonality. As discussed herein and in the Related Applications, some alternative embodiments provide for creation of data streams that not only have a user-configurable commonality, but also a user-configurable compressibility.

In the example 400 of FIG. 3, two or more data generators 402 and 404 generate data streams 406 and 408 that are supplied to a mixer 410. The mixer 410 may be similar, or identical, to any of the other mixers disclosed herein or in the Related Applications.

In some embodiments, the data streams 406 and 408 may be supplied by the same computing entity. The computing entity may, in some embodiments, take the form of a purpose-built entity that is configured to generate data streams having a particular commonality relative to respective data streams generated by one or more other entities in a population of entities. More generally however, the data streams 406 and/or 408 may be generated by any computing entity capable of generating a data stream.

Figure 4:
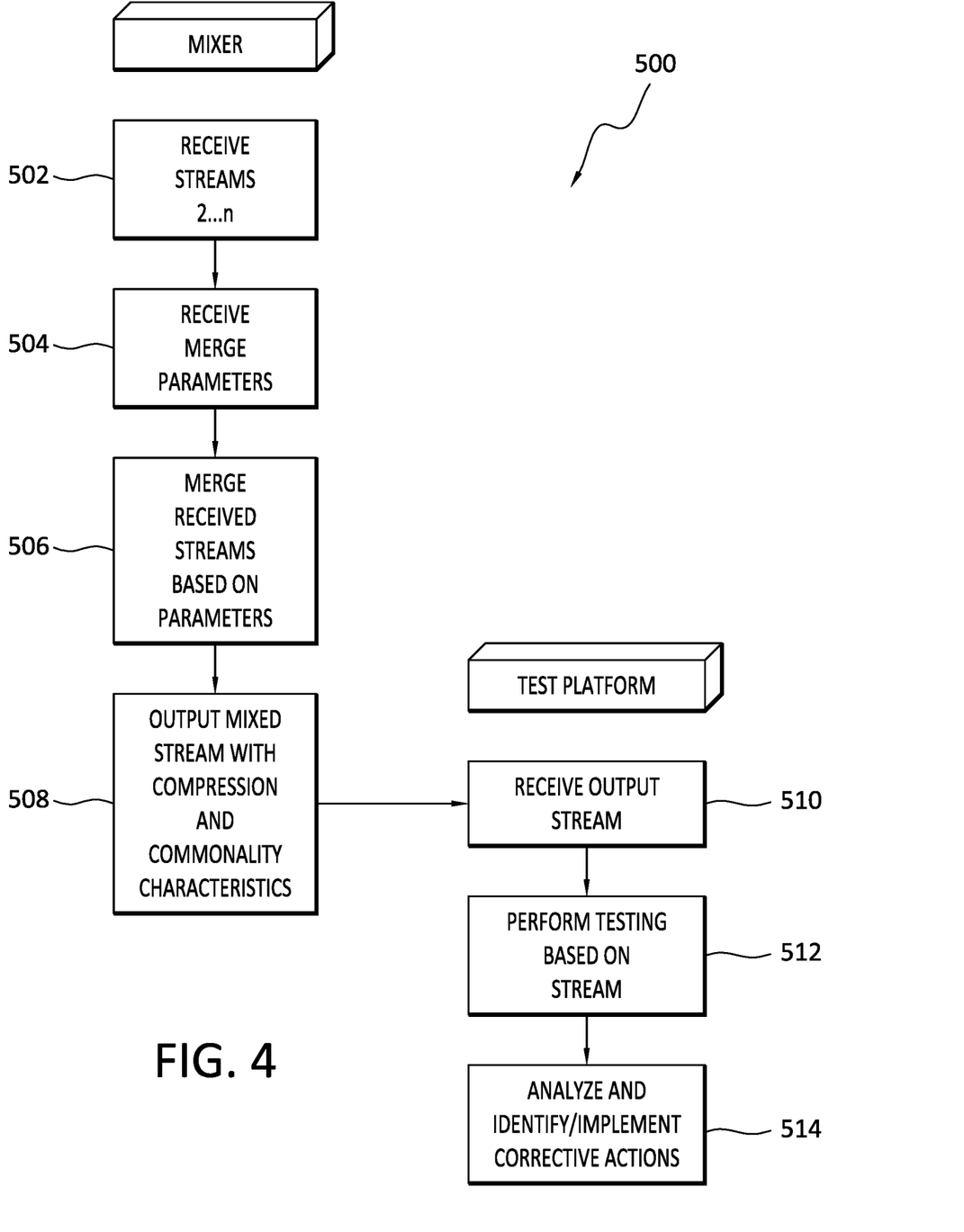
FIG. 4 is a flow diagram that discloses some general aspects of a method for generating mixed data streams.

While the example of FIG. 3 indicates two constituent data streams as being supplied to the mixer 410, it is noted that three, or more, constituent data streams may be supplied to the mixer 410 by a single computing entity, or by multiple different computing entities, such as data generators 402, 404 and data generator 'n' 405. Thus, the arrangement of FIG. 4 is presented only by way of example, and any number 'n' of data streams may be supplied, by any number 'n' of data generators, to the mixer 410, where 'n' is a positive integer 2.

As indicated in FIG. 3, the input, or merging, parameters provided to the mixer 410 include a desired commonality factor 'F' for the output data stream generated by the mixer 410. Thus, the base seed, self seed, and commonality factor 'F' are provided, but the compression factors M and N are omitted. The commonality factor 'F' may require, for example, that 20% of the data in the output data stream will be taken from the base seed data that is common to another data stream, and the other 80% of the data in the output data stream will be taken from the self seed data. Following are some further examples and discussion concerning mixing for commonality.

If it is assumed, for example, that the two components coming from two streams are picked as 800 KB and 200 KB, the mixed stream can be layered as 800/200/800/200/800/200. Such interleaving provides for a mixed data stream having a relatively fine granularity. However, if the mixed stream is layered as much larger chunks, such as 8 GB/2 GB/8 GB/2 GB for example, and the caller takes exactly 20 GB, then the 20% commonality requirement is met (16 GB unique+4 GB common), but if the caller only needs 15 GB, such as 8 GB/2 GB/5 GB, then since we have 13/2 ratio of common/unique, there is only about 15.4% commonality ($^2/_{13}$=15.38%). Thus, smaller chunks should be selected. On the other hand, if the mixed stream is layered as much smaller chunks, such as 4 KB/1 KB for example, the 20% commonality requirement is met in theory, but in practical terms, a dedupe engine may not be able to detect the 1 KB common area.

As these examples demonstrate, a chunk size should be selected that will keep the dedupe engine working effectively and efficiently. This is one reason to keep the minimal chunk size larger than the chunk size of the dedupe engine. As an example, it would be useful to keep the sequence as 7920 KB/80 KB for a 1% commonality when the dedupe engine typically creates chunks of 8 KB. If the desired accuracy is more granular (say 0.1%) then it would be useful to keep the sequence as 79920 KB/80 KB for a 0.1% commonality.

For the case of the 800 KB/200 KB sequence, this is a good uniform distribution since data from the base seed is seen after each 800 KB. The mix can also be changed and the variable amount of data from stream1 and/or stream2 obtained in such a way that the average is still 800 KB/200 KB. The variable layering can be based on uniform, random, or normalized, distribution. Here, the self/base sizes will be different but the same amount of data from the base stream would be inter-leaved with the desired mathematical distribution resulting in the same desired commonality factor.

It is noted that in some embodiments at least, compression, as evidenced by the compressibility factors M and N, can be injected by 402 and 404, respectively, and that compression will be reflected in the respective input data streams 406 and 408. For example, 4 input streams (0% self, 100% for self, 0% base and 100% for base, N and M) may be employed, and the mixer stage generates baseN and selfM. The next stage then mixes baseN and selfM to achieve the desired commonality.

Finally, and as noted herein, commonality processes may involve the processing of an input stream from a client that includes any number of components or constituents. By way of illustration, a commonality process may involve a stream from the client 101 that has 80% unique data that is compressible by 70%, 12% common data coming from group 1 that is compressible by 75%, and 8% common data coming from group 2 that is compressible by 50%. Thus, there is no limit to the number of components in a client data stream.

It was noted earlier with respect to FIG. 3 that some embodiments of the invention provide for data streams that not only have a desired commonality factor 'F' but also have a particular compressibility that is based on the commonality and compressibility of the input streams. Thus, in such embodiments, the merging parameters base seed, self seed, and compression factors M and N, are provided as mixer 410 inputs, in addition to the desired commonality factor 'F.'

As indicated in the example of FIG. 3, the data streams 406 and 408 may be components of a single data stream generated by a computing entity. For example, a data stream generated by a computing entity may have a base seed component, and a self-seed component, where the base seed component comprises, or consists of, data that is common with one or more data streams generated by other respective data generators, and the self-seed component comprises, or consists of, data that is unique to the client computing system. Further, the data stream 406 may comprise base seed data, such as 'ABCDEFGH . . . ' for example, and have a compressibility of N %. The data stream 408 may comprise self seed data, such as 'abcdefgh . . . ' for example, and have a compressibility of M %. The respective values for 'M' and 'N' can be any value in the range of 0 to 100.

Thus, the result of the use of the aforementioned merging parameters is a mixed output data stream 'AabcBdefCghiD . . . ' 412, generated by the mixer 410, that has a certain degree F. of data commonality, and is also compressible to an extent specified by the compression factors M and N. Thus, the compressibility of the output data stream is a function of the data commonality F, as well as the compressibility factors M (30 for example) and N (20 for example).

To illustrate briefly with respect to the compressibility property of the output data stream 412, if 20 GB of the data in a 100 GB output stream is base seed data (that is, F=20%), and 80 GB of the data for the output data stream is self seed data, Application of the respective compressibility values indicates that the base seed data is compressible to 16 GB (20 GB×(1.00-0.20)), and the self seed data is compressible to 56 GB (80 GB×(1-0.3)). Thus, the 100 GB of data is compressible to a total of 72 GB (16 GB+56 GB), giving an overall compressibility of approximately 28% for the output data stream. It should be noted that all of the numbers in this example are approximate, as the amounts of data employed, and the compressibility achieved, are not likely to be exact. Even though this 100 GB stream is sort of compressible by itself to 72 GB, this stream is actually deduplicatable to just 80 GB (the 20 GB common component is pure duplicate) and 56 GB after compression is applied.

With the foregoing discussion of FIG. 3 in view, it is noted that when two or more data streams are mixed together, the mixing of the data in the two data streams can be performed in various ways. For example, the mixing may be uniform, clustered, random, or normalized. The particular mixing process employed can be selected based on the particular circumstances involved. Some examples of these mixing processes are discussed below, and mixing processes that can be employed in connection with embodiments of the invention are also disclosed in the Related Cases.

One particular technique for mixing data streams is to uniformly mix, or merge, the data of the constituent streams. For example, if a 100G stream is to have 90% unique data, and 10% common data, a nonuniform mixing of the data is to arrange the data in serial fashion where, for example, the 10% common data is followed by the 90% unique data, or vice versa. In contrast, a uniform mixing of the data might take the form, for example, of data arranged in the mixed data stream thus: 1 MB (common), 9 MB (unique), 1 MB (common), 9 MB (unique) . . . until a mixed data stream of 100 GB is defined. In this way, the common data and the unique data are uniformly distributed in the mixed data stream. In some cases, it may be useful to set a minimum size for the chunks or groupings of data. In the example above, the chunks are either 1 MB or 9 MB. If the chunk size is too small, a deduplication server may not be able to discern commonalities in the data and, as a result, all of the data in the data stream may, incorrectly, appear to be unique to the deduplication server.

Another method of mixing data streams is to mix the data randomly. In this approach to mixing data streams, the chunk sizes are random. In contrast, in the preceding example, the chunk sizes are not random but are either 1 MB or 9 MB. For example, chunk sizes may be selected as 100K, 75K, 125K . . . . In this case, the stream size of the mixed stream may be specified, such as 100 GB for example. As well, a minimum and/or maximum chunk size may be specified, and random chunk sizes within those bounds may be specified. With reference to the foregoing example, a minimum chunk size of 50K may be specified and/or a maximum chunk size of 150K may be specified. As noted, the minimum chunk size may help to ensure that the granularity of the mixed stream is not so fine that a deduplication server would fail to recognize common data in the mixed stream.

Still another approach to mixing, or merging, multiple data streams involves a normalized mixing of the data from the constituent data streams. In a data stream exhibiting normalized mixing, the data chunks may be arranged thus: unique data; mixed data; unique data . . . . Thus, in a data stream with normalized mixing, the mixed data is seen in a particular portion, or portions, of the data stream.

A further approach to mixing or merging multiple data streams involves a clustered mixing of the data in the data stream. In particular, the mixed data stream may be configured such that the data stream includes portions where data of the constituent streams is not mixed together, and the data stream includes other portions where data of the constituent data streams is mixed together.

It is noted that multiple different mixing techniques may be employed in connection with a particular mixed data stream. Thus, the techniques noted above are presented by way of example only, and still other techniques can be defined and implemented that employ two or more mixing processes to create a mixed data stream.

D. Aspects of Some Example Methods

With reference now to FIG. 4, details are provided concerning aspects of example methods for mixing two or more data streams, where one example of such a method is denoted generally at 500. The method 500 may be performed by and/or at the direction of a mixer, examples of which are disclosed herein. Some parts of the method 500 may be performed by other entities, such as a test platform for example. In general however, the functional allocation indicated in FIG. 4 is provided only by way of example and, in other embodiments, the functions disclosed in FIG. 4 may be allocated in various other ways.

The method 500 may begin at 502 when multiple data streams 2 . . . n, where n is ≥2, are received at a mixer. One or more of the data streams may be received from a data generator. As well, one or more of the data streams may be received from an entity specifically configured to generate data streams. In some cases, two or more of the data streams are received from a common entity, while in other cases, two or more of the data streams are received from different respective entities. Each of the received data streams may have respective compressibility and/or commonality characteristics.

After, or before, receipt of the 'n' data streams 502, the mixer may also receive inputs in the form of one or more merging parameters 504 that are usable by the mixer to create a mixed data stream having particular characteristics. Such characteristics include, for example, compressibility and commonality. The merging parameters 504 may be received from a user by way of a UI or API for example. In some embodiments, the mixer may affirmatively access a library, for example, and retrieve one or more of the merging parameters.

Using the merging parameters, the mixer is then able to merge 506 the received data streams to create a mixed data stream having characteristics specified by the merging parameters. The data streams may be merged together 506 in any of a variety of ways. For example, the mixer may employ a uniform, random, normalized, or clustered mixing process, or a combination of these, to generate 506 the output data stream.

The mixed data stream can then be output 508 by the mixer. The mixed data stream possesses the compressibility and/or commonality characteristics specified by the merge parameters. The mixer may output 508 the mixed data stream to any of a variety of recipients. In some cases, the mixed data stream may be stored. Additionally, or alternatively, the mixed data stream may be output to 508, and received by 510 a test platform.

The test platform may use the data stream as a basis for performing testing operations 512. The testing operations 512 may involve, for example, providing the data stream to an application and/or hardware, and then observing and recording the response of the application and/or hardware to the data stream. In at least some embodiments, the data stream mimics, or duplicates, real world conditions. In this way, personnel, such as developers, are able to observe the response of an application, for example, to the data. The response of the application and/or hardware may be stored in some embodiments. As well, simulated streams according to embodiments of the invention may be used by customers to test the effectiveness of a dedupe solution that the customer is considering to purchase, since the customer may not want to send their real data to the new platform under consideration either for security concerns or for the concern related to breaking their normal operating environment.

The data stream and/or the response information may then be analyzed 514. Among other things, such analysis 514 may involve identifying any problems with the operation of the application and/or hardware to which the data stream was supplied during testing 512. The analysis 514 may also include identifying and implementing one or more corrective actions to resolve the problems that were identified during testing 512.

In this way, embodiments of the invention enable testing of applications and other software, as well as hardware, for example, during a development process so as to help ensure that the applications, software, and hardware, will operate as expected. This may reduce, or eliminate, one or more problems that would otherwise be experienced by a purchaser and/or user of the applications, hardware, and software. Further, because mixed data streams generated according to embodiments of the invention are highly configurable in terms of their compressibility and commonality, at least, such mixed data streams can be generated to suit a variety of conditions and scenarios. Various other advantages of example embodiments of the invention will be apparent from the present disclosure.

Figure 5:
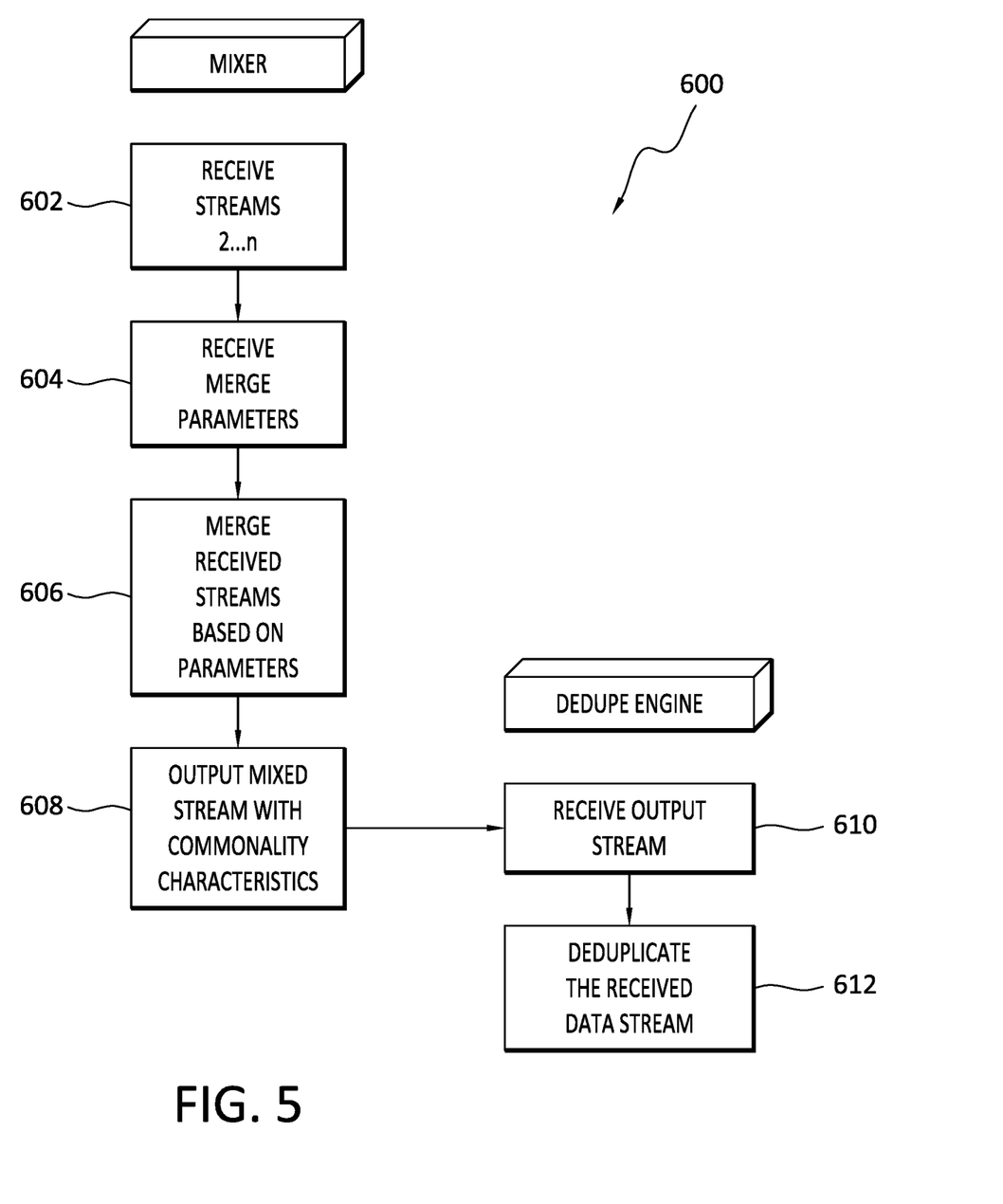
FIG. 5 is a flow diagram that discloses some general aspects of a method for generating mixed data streams having commonality.

With attention next to FIG. 5, details are provided concerning aspects of example methods for mixing two or more data streams, where one example of such a method is denoted generally at 600. The method 600 may be performed by and/or at the direction of a mixer, examples of which are disclosed herein. Some parts of the method 600 may be performed by other entities, such as deduplication engine for example. In some embodiments, the mixer and the deduplication engine may be elements of a single common computing entity. In general however, the functional allocation indicated in FIG. 5 is provided only by way of example and, in other embodiments, the functions disclosed in FIG. 5 may be allocated in various other ways.

The method 600 may begin when an entity, such as a mixer for example, receives 'n' data streams 602. In general, 'n' can be any positive integer that is ≥2, and the scope of the invention is not limited to any particular number of data streams. The data streams may be received 602 from a single source, such as a client that is one member of a population of multiple computing entities, but that is not required. Thus, in other embodiments, one or more of the data streams may be received 602 from different respective sources.

The mixer may also receive one or more merge parameters 604. In the example of FIG. 5, the merge parameter may comprise, or consist of, a commonality factor 'F.' As disclosed herein, the commonality factor 'F' indicates an extent to which a mixed data stream created by a mixer, or other entity, includes data that is common with respect to one or more computing entities of a population of computing entities. Because the commonality factor 'F' can be specified, a particular commonality 'F' of the output data stream can be implemented as needed. It is noted that in some alternative embodiments, the commonality factor 'F' may be received 604 prior to receipt 602 of the 'n' data streams. In still other embodiments, the commonality factor 'F' and the 'n' data streams may be received at the same time. As noted earlier, the commonality factor F that is provided to the mixer as a merge parameter is a set of values that includes a respective commonality value for each of the base seeds. Thus, for example, a commonality factor F for 'n' base seeds would include the commonality values f1, f2, f3 . . . fn.

In any case, after the 'n' data streams have been received 602, and the merge parameter(s), such as the commonality factor 'F,' input has been received 604, the mixer or other entity can then merge 606 the received 'n' data streams based on the merge parameter. This merging, or mixing, 606 of the 'n' data streams may comprise layering respective data of the 'n' data streams together to create the mixed data stream 606. One or more characteristics of the mixed data stream, including the commonality of the mixed data stream, can mimic characteristics of real world data generated by an application or other data generator.

The mixed data stream created 606 by the mixer can then be output 608 to one or more computing entities for use and/or processing by those entities. In the example of FIG. 5, the mixed data stream is output 608 to a deduplication engine. The deduplication engine then receives 610 the mixed data stream. In the example of FIG. 5, the deduplication engine performs a deduplication process 612 on the mixed data stream received 610 from the mixer. More particularly, the deduplication engine deduplicates 612 the data in the mixed data stream that is common to one or more other data streams received by the deduplication engine. The process 600 may end after deduplication 612 has been performed, or after the mixed data stream has been created 606, or transmitted 608.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving a first data stream, and a second data stream, wherein the first data stream was generated using a base seed and has a compressibility N, and the second data stream was generated using a self seed and has a compressibility M, wherein the first data stream includes a base seed component that comprises data that is common with data of another data stream, and the second data stream includes a self-seed component that comprises data that is unique to a particular computing entity;

receiving a commonality factor 'F';

using the commonality factor 'F,' the base seed component, and the self seed component, to create a mixed data stream having a commonality of 'F' by mixing data from the first and second data streams together, wherein the commonality of 'F' of the mixed data stream indicates (i) an extent to which the mixed data stream includes base seed component data, and (ii) an extent to which the mixed data stream includes self-seed component data; and outputting the mixed data stream.

2. The method as recited in claim 1, wherein both the first data stream and the second data stream are received from a common computing entity.

3. The method as recited in claim 1, wherein mixing data from the first and second data streams together comprises layering respective data from each of the first and second data streams.

4. The method as recited in claim 3, wherein layering of the data is performed according to one of: a uniform distribution; a random distribution; a clustered distribution; or, a normalized distribution.

5. The method as recited in claim 1, wherein outputting the mixed data stream comprises supplying the mixed data stream to a deduplication engine, or to a test platform.

6. The method as recited in claim 1, wherein the mixed data stream is generated using the compressibility N and the compressibility M.

7. The method as recited in claim 1, further comprising deduplicating data of the mixed data stream that is common to one or more other data streams.

8. The method as recited in claim 1, wherein each of the first data stream and the second data stream is received from a respective client, and each client is identifiable by a respective unique combination (base seed, self seed), wherein the base seed in the combination corresponds to a particular population of clients, and the self seed in the combination identifies a particular client in that population of clients.

9. The method as recited in claim 1, wherein the first data stream has a plurality of components, and each of the components of the first data stream has a respective compressibility value and a respective commonality value.

10. A non-transitory storage medium having stored therein instructions which are executable by one or more hardware processors to perform operations comprising:

receiving a first data stream, and a second data stream, wherein the first data stream was generated using a base seed and has a compressibility N, and the second data stream was generated using a self seed and has a compressibility M, wherein the first data stream includes a base seed component that comprises data that is common with data of another data stream, and the second data stream includes a self-seed component that comprises data that is unique to a particular computing entity;

receiving a commonality factor 'F';

using the commonality factor 'F,' the base seed component, and the self seed component, to create a mixed data stream having a commonality of 'F' by mixing data from the first and second data streams together, wherein the commonality of 'F' of the mixed data stream indicates (i) an extent to which the mixed data stream includes base seed component data, and (ii) an extent to which the mixed data stream includes self-seed component data; and outputting the mixed data stream.

11. The non-transitory storage medium as recited in claim 10, wherein both the first data stream and the second data stream are received from a common computing entity.

12. The non-transitory storage medium as recited in claim 10, wherein mixing data from the first and second data streams together comprises layering respective data from each of the first and second data streams.

13. The non-transitory storage medium as recited in claim 12, wherein layering of the data is performed according to one of: a uniform distribution; a random distribution; a clustered distribution; or, a normalized distribution.

14. The non-transitory storage medium as recited in claim 10, wherein outputting the mixed data stream comprises supplying the mixed data stream to a deduplication engine, or to a test platform.

15. The non-transitory storage medium as recited in claim 10, wherein the mixed data stream is generated using the compressibility N and the compressibility M.

16. The non-transitory storage medium as recited in claim 10, wherein the operations further comprise deduplicating data of the mixed data stream that is common to one or more other data streams.

17. The non-transitory storage medium as recited in claim 10, wherein each of the first data stream and the second data stream is received from a respective client, and each client is identifiable by a respective unique combination (base seed, self seed), wherein the base seed in the combination corresponds to a particular population of clients, and the self seed in the combination identifies a particular client in that population of clients.

18. The non-transitory storage medium as recited in claim 10, wherein the first data stream has a plurality of components, and each of the components of the first data stream has a respective compressibility value and a respective commonality value.

* * * * *